United States Patent Office 3,325,558
Patented June 13, 1967

3,325,558
PREPARATION OF LIQUID POLYMERS OF BUTADIENE
Donald K. George, Mentor, Ohio, and Louis T. Gunkel, Anne Arundel County, Md., assignors to FMC Corporation, New York, N.Y., a corporation of Delaware
No Drawing. Filed Apr. 8, 1964, Ser. No. 358,374
2 Claims. (Cl. 260—680)

This invention relates to the preparation of liquid polymers of butadiene, and more particularly, to an improved method of consistently preparing liquid homopolymers and copolymers of butadiene having predetermined properties.

Liquid polymers of butadiene are most commonly used as drying oils, coatings, rubber additives, and intermediates in the preparation of epoxidized polybutadiene resins. These polymers are generally prepared by heating butadiene or a mixture of butadiene and a comonomer with a finely divided sodium dispersion catalyst under pressure in the presence of an inert solvent such as benzene to effect the desired polymerization. Small amounts of reaction modifiers such as dioxane and isopropanol are often added to reduce product color, increase reaction rate, and control the microstructure of the polymer. Polymer viscosity and molecular weight are theoretically controlled in these polymerizations by the relative proportion of sodium catalyst and monomer used, larger proportions of sodium tending to provide decreased polymer viscosity and molecular weight.

The polymerization reaction is typically characterized by a relatively slow, highly exothermic initiation followed by a relatively fast, somewhat less exothermic polymerization. In theory, the polymerization reaction should be essentially non-terminating so long as some monomer is available for adsorption by the growing polymer chain. In practice, however, self-termination of the polymerization reaction is very commonly encountered.

By "self-termination" we do not necessarily mean that the entire polymerization reaction terminates, but that at least some of the growing polymer chains prematurely terminate. In polymerizations affected by self-termination, the initially high rate of polymerization decreases significantly as the reaction progresses, despite the presence of ample quantities of butadiene. In many cases, the reaction may stop altogether at some low or intermediate level of conversion. This self-termination phenomenon appears to be quite random in nature, and even occurs in systems from which water and other active hydrogen compounds have been systematically excluded. Thus, while some polymerizations may proceed rapidly to the desired degree of polymerization, others will decrease significantly in reaction rate prior to reaching the desired degree of polymerization, and still others will prematurely stop altogether.

In batch processes, self-termination results in short and variable size polymerization batches and thereby seriously limits production capacity. In continuous processes, employing simultaneous initiation and propagation, self-termination necessitates reinitiation of the reaction after its rate has decreased to an uneconomical level or it has stopped altogether thus greatly reducing the catalyst efficiency of the process.

In U.S. Patent No. 2,732,412, a method of restarting self-terminated butadiene polymerization reactions by the addition of metallic potassium is taught. Although some success has been achieved by this method, there are numerous difficulties associated with the practical employment of this technique. For example, constant surveillance of the reaction, which is necessary to determine the point at which uneconomical operation occurs, is tedious, and reinitiation of the reaction, which is under pressure, requires irregular operation of the equipment. Severe economic penalties are also incurred in the use of potassium metal.

In addition to the economic problems associated with self-termination, this phenomenon also results in the production of butadiene polymers having erratic variations in average molecular weight, molecular weight distribution, and viscosity. Since self-termination by definition involves the premature termination of at least some polymer chains, the molecular weight of the polymer chains which terminate first will always be abnormally low. When self-termination only causes a reduction in reaction rate and the desired amount of butadiene is ultimately absorbed, the molecular weight of the polymer chains which continue to grow until the end of the polymerization will always be abnormally high since these chains ultimately absorb the butadiene which ordinarily would have been absorbed by the terminated chains.

In U.S. Patent No. 2,631,175, a method of preparing liquid butadiene polymers of controlled viscosity which are free of dissolved higher molecular weight solid polymer is suggested. The process involves charging the reactor with a large volume of solvent and a sodium dispersion containing not more than 2 parts by weight of sodium per 100 parts of total butadiene charged, heating the mixture to the initiation temperature, adding butadiene to provide a concentration of 3–15% by weight of the solvent, and after initiation has begun, charging additional butadiene at the rate of 0.03–0.4 part by weight of butadiene per hour per part of solvent present. Although this process does avoid the formation of solid polymer dissolved in the liquid polymer, it does not avoid random self-termination.

Variations in molecular weight, molecular weight distribution, and viscosity are particularly troublesome when preparing liquid polybutadiene which is to be used in the production of epoxidized polybutadiene. The behavior of the epoxidation reaction and its effect upon the properties of the epoxidized polymer are greatly influenced by the characteristics of the butadiene polymer being epoxidized. In U.S. Patent No. 3,030,336, F. P. Greenspan et al., indicate that epoxidized polybutadiene is preferably prepared from polybutadiene having specific characteristics. For example, the polybutadiene should have a substantially linear structure, a molecular weight of 250–2500, a viscosity less than 50 poises at 25° C., an iodine number of 350–450, and over 65% of the unsaturation as vinyl groups. Extremely close control of the polymerization reaction is necessary to produce polybutadiene having these characteristics. When polymers not having these characteristics are epoxidized, erratic results, most commonly characterized by unusually high viscosities, are encountered.

It is an object of this invention to provide an economical method of closely controlling butadiene polymerization reactions so as to avoid self-termination.

Another object is to provide an improved method of consistently preparing liquid butadiene polymer batches of uniform size without using additional catalyst to reinitiate the reaction.

A further object is to provide a method of consistently and reproducibly preparing liquid polymers of butadiene having predetermined characteristics which are tailored to the specific use intended for the polymer.

These and other objects will become apparent from the following description of this invention.

We have now discovered that the tendency for self-termination during sodium-catalyzed butadiene polymerization reactions can be markedly suppressed and essentially eliminated by first forming a catalytically active species, referred to herein as an "initiate" and then using this catalytic initiate in the subsequent butadiene polymerization. The catalytic initiate of this invention is formed by thoroughly mixing 1 part by weight of finely divided sodium dispersed in an inert hydrocarbon solvent with about 1–3 parts of butadiene-1,3, about 0.5–1.5 parts of an ether modifier selected from the group consisting of di(lower alkyl) ethers, dioxane-1,4 and tetrahydrofuran, and about 0.05–0.5 part of a lower aliphatic alcohol at a temperature below about 80° C., and raising the temperature of the mixture to about 80–110° C. thereby forming a catalytic initiate. The catalytic initiate is then reacted with monomer containing 60–100% butadiene-1,3 and 0–40% ethylenically unsaturated comonomer at a temperature of 40–120° C. until a polymer of the desired molecular weight and viscosity is formed.

Although we do not want to be limited to any particular theory or mechanism, it is believed that, under the initiation conditions of this invention, sodium and butadiene react in essentially a 1:1 molar ratio to form a butadiene-sodium adduct in accordance with the equation:

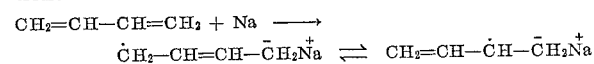

This adduct is then capable of dimerizing as follows:

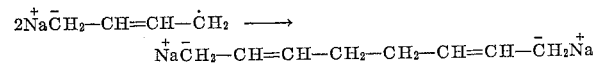

Other isomeric forms of the dimer are also possible. This adduct, or the dimerized form, which may be accompanied by some higher molecular weight adducts, is believed to be the actual catalytic initiate which reacts with additional monomer in a step-wise, non-terminating fashion to reproducibly yield butadiene homopolymers and copolymers of almost any desired molecular weight and viscosity.

The sodium dispersion which is used in the process of this invention may be prepared in the conventional manner which is well known to those skilled in the art. The sodium is first melted and then dispersed as finely divided particles in an inert hydrocarbon solvent with the aid of a dispersing agent such as aluminum stearate using a suitable mixer. Preferably, the dispersed sodium has an average particle size of less than about 100 microns. Suitable dispersion solvents include aliphatic hydrocarbons such as hexane and heptane, aromatic hydrocarbons such as benzene, toluene and xylene, mixed hydrocarbon fractions such as kerosene, ultrasene, mineral spirits and other naphthas, and other similar inert hydrocarbon solvents. Preferably, the sodium dispersion is prepared in the same solvent as will be used during the polymerization reaction, although this is not essential. The preferred solvent is benzene because it is inexpensive, has a vapor pressure sufficiently high to facilitate reflux cooling, and can easily be separated from the polymeric product by distillation. The sodium dispersion is generally prepared at a sodium concentration of about 10–80%, and preferably about 30–50% by weight.

For proper operation of the process of this invention, the initiation step should be conducted using about 1–3 parts by weight of butadiene-1,3 per part of sodium. This corresponds to about 0.4–1.3 gram moles of butadiene for each gram atom of sodium. Theoretically, as pointed out above, these reactants should be present in a stoichiometric ratio of about 1:1. However, smaller amounts of butadiene are most commonly used because of the competition between the sodium metal and the butadiene-sodium adduct for reaction with unconverted butadiene. Inevitably, some low molecular weight polymeric material is formed in addition to the disodio-octadiene type of material shown above. By lowering the ratio of butadiene to sodium, the tendency to form these undesirable polymeric materials is reduced. A preferred ratio, which minimizes polymer formation during initiation and at the same time gives reasonably good sodium utilization, is about 0.65–0.85 gram mole of butadiene per gram atom of sodium, which corresponds to about 1.5–2.0 parts by weight of butadiene per part of sodium.

In order to control the polymer microstructure, that is, the ratio of 1,2- to 1,4-butadiene enchainment during polymerization, it is necessary to have an ether modifier present during the polymerization reaction. It is likewise desirable to have the modifier present during the initiation step since control is thereby exercised over the microstructure of any polymers produced during initiation. Suitable ether modifiers include aliphatic ethers such as diethyl ether, diisopropyl ether and ethyl isobutyl ether, and cyclic ethers such as dioxane-1,4 and tetrahydrofuran. Dioxane is the preferred modifier since it provides essentially colorless polymers containing a high percentage of their unsaturation as vinyl groups. Good results are obtained with about 0.5–1.5 parts by weight of ether modifier per part of sodium, and preferably about 0.8–1.2 parts of dioxane per part of sodium.

Ether modifiers also have the adverse property of severely inhibiting the initiation process. The addition of ether to the initiation mixture effectively prevents initiation from occurring at any practical rate. This inhibition creates a particularly serious problem in continuous processes. However, this problem can be overcome by the incorporation of a small amount of a lower aliphatic alcohol which acts as an activator for the initiation system. Thus, it is an essential feature of this invention that an alcohol activator be present along with the ether modifier during the initiation step. Suitable alcohols include methyl, ethyl, isopropyl, isobutyl, sec-butyl, tert-butyl, and amyl alcohols. In general, about 0.05–0.5 part by weight of alcohol per part of sodium is employed, and preferably about 0.1–0.4 part of isopropyl alcohol per part of sodium.

For convenience, additional inert hydrocarbon solvent is generally added to the initiation mixture, but its concentration in the mixture is in no way critical to the success of the process of this invention. Solvent concentration during initiation can be varied over wide limits. When heat transfer efficiency is maximized, as when conducting the initiation in a continuous flow reactor having a high surface to volume ratio, only small amounts of solvent are required. If desired, the solvent used in the sodium dispersion can serve as the sole solvent for the initiation reaction. Preferably, about 0.5–5 parts by weight of solvent per part of butadiene are used in the initiation step to increase mobility of the reaction mixture and to improve heat transfer during the reaction.

The sodium dispersion should be thoroughly mixed with the butadiene, ether modifier, alcohol activator, and any additional solvent at a temperature sufficiently low to prevent reaction, generally below about 80° C., and preferably below about 30° C. Generally, mixing is carried out at about room temperature. It is essential for proper operation of this invention that no reaction take place until all of the ingredients have been thoroughly mixed. Since butadiene is a gas, mixing is conveniently carried out in a closed system under butadiene pressure.

After the reactants have been thoroughly mixed, the mixture is heated in a closed system to the temperature at which initiation begins, generally at about 80–90° C. The initiation reaction is highly exothermic and it is necessary to control the temperature of the reaction mixture within the range of about 80–110° C., and preferably about 90–105° C. If the temperature is below about 80° C., the reaction is sluggish and incomplete; at temperatures above about 110° C., self-termination of the subsequent polymerization is frequently encountered. The pressure used during initiation is not critical and for convenience is generally autogenous.

When the initiation reaction is carried out using the preferred reaction mixture indicated above at temperatures of about 80–110° C., and preferably about 90–105° C., excellent utilization of sodium is observed, the catalytic initiate is highly reproducible in replicate runs, and no self-termination or notable decrease in reaction rate is encountered. Under these preferred conditions, polymer of almost any desired molecular weight and viscosity can be prepared reproducibly by simply adding the appropriate amount of monomer during the subsequent polymerization step.

When formation of the catalytic initiate is complete, the polymerization reaction is carried out by reacting the initiate with monomer containing 60–100% butadine-1,3 and 0–40% ethylenically unsaturated comonomer until a butadiene homopolymer or copolymer of the desired molecular weight and viscosity has been obtained. Liquid polymers of butadiene generally have viscosities of about 1–100,000 poises and number average molecular weights of about 500–10,000. Preferably, the polymers have viscosities of about 5–50 poises. When butadiene copolymers are desired, any of the conventional comonomers may be used including vinylbenzenes such as styrene, vinyltoluene, α-methylstyrene, dimethylstyrene, and diethylstyrene; acrylic monomers such as acrylonitrile, methacrylonitrile, methyl acrylate, methyl methacrylate, and ethyl acrylate; vinyl esters such as vinyl acetate and vinyl propionate; vinyl halides such as vinyl chloride and vinyl bromide; vinyl ethers such as vinyl ethyl ether and vinyl isobutyl ether; vinyl ketones such as methyl vinyl ketone and methyl isopropenyl ketone; and vinyl alcohol, as well as many other well known ethylenically unsaturated comonomers.

During the polymerization step, additional anhydrous solvent is sometimes added to increase the mobility of the reaction mixture during polymerization and destruction of the catalyst at the end of the reaction. This solvent may be any of the inert hydrocarbon solvents previously indicated as being suitable for use in preparing the sodium dispersion.

The temperature employed for the polymerization reaction should be in the range of about 40–120° C. The polymerization reaction will, of course, be altered by variations in the reaction temperature, higher temperatures resulting in higher reaction rates. Preferably, the polymerization is conducted at temperatures of about 90–110° C. The pressure used is not critical and will generally be determined by the rate at which butadiene is charged to the closed system.

When the polymeric product atttains the desired molecular weight and viscosity, the catalyst may be destroyed in any conventional manner well known to those skilled in the art. A convenient method is to quench the reaction medium in a body of water or dilute acid which hydrolyzes the sodium.

The improved polymerization process of this invention may be carried out in a variety of different ways. The mixing, initiation and polymerization steps may be carried out consecutively in the same reaction vessel, or two different reaction vessels may be used. When two reactors of unequal size are employed, initiation ingredients are generally mixed and reacted to form the catalytic initiate in the smaller vessel, and transferred, with the exclusion of oxygen, moisture and other active materials which may destroy the organometallic initiate, to the larger vessel where the polymerization is carried out. The catalytic initiate may also be prepared in relatively large quantities in a separate vessel and charged to a plurality of polymerization reactors. Continuous polymerization can be accomplished by continuously adding the initiation ingredients to a flow reactor with thorough mixing, passing the initiation mixture through a heating zone wherein the catalytic initiate is formed, and then into a polymerization zone wherein additional monomer is continuously added, and continuously removing butadiene polymer having the desired molecular weight and viscosity.

The following examples, illustrating the novel method of preparing liquid polymers of butadiene disclosed herein, are presented without any intention that the invention be limited thereto. All parts and percentages are by weight.

EXAMPLE 1

One hundred milliliters of sodium dispersion containing 40 g. of sodium having an average particle size of about 10–15 microns dispersed in mineral spirits, 100 ml. of benzene, 20 g. of methanol, and 50 g. of dioxane were added to a 1-gal. pressure vessel equipped with an agitator, temperature controls, and inlets for solvent and butadiene. After sealing the reactor, 100 g. of butadiene was pumped in, the contents were thoroughly mixed, and heat was applied to raise the temperature of the mixture from 25° C. to 100° C. The pressure in the reactor at this point was about 40 p.s.i.g. After holding the mixture at 100° C. for about 3 min., an exothermic reaction and concurrent pressure decrease were observed, and cooling was applied to maintain the reaction mixture at 98–102° C. The exotherm subsided after about 2 min. and the pressure in the reactor stabilized at 20–22 p.s.i.g.

An additional 100 ml. of benzene was then pumped in and butadiene was fed on demand while maintaining the pressure in the reactor at 22 p.s.i.g. and holding the reaction temperature at 100–102° C. Butadiene feed was stopped after a total of 908 g. of butadiene, including the initiation charge, had been absorbed. The mixture was held at 100–102° C. for an additional 2 min., cooled to 50° C. and quenched into 1000 ml. of water while maintaining a nitrogen blanket to prevent exposure to oxygen. After washing the polymer solution twice with water to remove residual alkali, a sample was dried over excess magnesium sulfate and stripped free of solvent at a pressure of 1.0 mm./Hg and a temperature of 100–115° C. The resultant product was a clear, almost colorless oil having a viscosity of 11.0 poises at 25° C., a number-average molecular weight of 1000, a Gardner-Holdt color of 1.0, and an iodine number of 436.

In order to illustrate the absence of self-termination and the ease of reproducibility of polymer viscosity and molecular weight in accordance with this invention, the above example was repeated 17 times using the recipe and procedure described above. The results were as follows:

| Run | Butadiene Absorbed (grams) | Viscosity at 25° C. (poises) | Molecular Weight |
| --- | --- | --- | --- |
| A | 908 | 12.0 | 983 |
| B | 908 | 12.8 | 922 |
| C | 908 | 10.6 | 914 |
| D | 908 | 12.0 | 1,047 |
| E | 908 | 10.8 | 1,018 |
| F | 908 | 10.5 | 951 |
| G | 908 | 11.4 | 1,062 |
| H | 908 | 10.5 | 999 |
| I | 908 | 12.8 | 1,066 |
| J | 908 | 11.0 | 1,030 |
| K | 908 | 12.5 | 1,046 |
| L | 908 | 10.5 | 1,010 |
| M | 908 | 10.7 | 957 |
| N | 908 | 12.7 | 1,094 |
| O | 908 | 11.0 | 1,046 |
| P | 908 | 11.5 | 1,013 |
| Q | 908 | 12.3 | 1,059 |

EXAMPLE 2

To a catalytic initiate prepared as in Example 1, a mixture of butadiene and styrene was fed until 1300 g. of additional butadiene and 600 g. of styrene were absorbed. The resulting product was worked up as in Example 1 to give a liquid copolymer having a viscosity of 1500 poises.

EXAMPLE 3

Twenty-five grams of sodium having an average particle size of 10–20 microns dispersed in twice its weight of benzene was transferred along with 30 g. of dioxane and 5 g. of isopropanol to a 1-gal. autoclave. After sealing the reactor, 65 g. of butadiene was pumped in, the contents were thoroughly mixed, and the mixture was heated to 96–98° C. and held at that temperature for 5 min. to allow complete reaction.

The temperature was then raised to 110° C. and 1000 ml. of commercial mixed xylene diluent was pumped in, followed by butadiene added at a rate sufficient to maintain the reaction temperature at 110–115° C. When a total of 908 g. of butadiene, including the initial charge, had been absorbed, the reaction mixture was cooled and then quenched into water to destroy the catalyst. The polymer solution was washed twice with water and then stripped under vacuum at 110–120° C. until free of water and solvent. The product consisted of 900 g. of a clear, almost colorless oil having a viscosity of 25.0 poises at 25° C., a number-average molecular weight of 1700, and an iodine number of 430.

In order to illustrate the freedom from self-termination and the ease of viscosity reproducibility of the process of this invention, the above example was repeated 11 times using the recipe and procedure described above. The following data were obtained:

| Run | Butadiene Absorbed (grams) | Viscosity at 25° C. (poises) |
|---|---|---|
| A | 908 | 26.5 |
| B | 908 | 24.5 |
| C | 908 | 27.5 |
| D | 908 | 27.7 |
| E | 908 | 26.5 |
| F | 908 | 25.0 |
| G | 908 | 25.8 |
| H | 908 | 24.0 |
| I | 908 | 24.5 |
| J | 908 | 26.0 |
| K | 908 | 26.5 |

EXAMPLE 4

One part of sodium having an average particle size of about 25 microns, as a 36% dispersion in toluene, was added along with 0.6 part of dioxane, 10 parts of toluene, and 0.1 part of isopropanol to an autoclave. Two and four-tenths parts of butadiene was then pumped in, the contents were thoroughly mixed, and the mixture was heated to a temperature of 90–93° C. and held at this temperature for 10 min. to allow completion of the initiation reaction.

The temperature was then increased to 100–105° C. and 8 parts of additional butadiene was added as rapidly as temperature control would permit. The reaction product was worked-up as in Example 3 to yield a colorless oil having a viscosity of 1.0 poise at 25° C., a number-average molecular weight of 500, and an iodine number of 432.

A replicate series of 15 identical polymerization runs was then made using the above recipe and procedure to demonstrate the ease of viscosity reproducibility and freedom from self-termination. The following data were obtained:

| Run | Butadiene Absorbed (parts) | Viscosity at 25° C. (poises) |
|---|---|---|
| A | 10.4 | 1.0 |
| B | 10.4 | 2.0 |
| C | 10.4 | 2.5 |
| D | 10.4 | 1.0 |
| E | 10.4 | 2.0 |
| F | 10.4 | 2.5 |
| G | 10.4 | 1.0 |
| H | 10.4 | 1.0 |
| I | 10.4 | 1.0 |
| J | 10.4 | 2.0 |
| K | 10.4 | 2.5 |
| L | 10.4 | 2.5 |
| M | 10.4 | 2.5 |
| N | 10.4 | 1.5 |
| O | 10.4 | 2.5 |

EXAMPLE 5

One part of sodium having an average particle size of 20–60 microns, as a 50% dispersion in benzene, was added along with 100 parts of toluene, 1 part of diethyl ether and 0.15 part of isobutyl alcohol to an autoclave. Three parts of butadiene-1,3 was then pumped in, the contents of the autoclave were thoroughly mixed at 25° C., and the reaction mixture was heated to 105° C. After about 2 min. at this temperature, the exothermic initiation reaction had ceased.

Additional butadiene-1,3 was fed to the reactor while maintaining the reaction temperature at 105° C. until a total of 272 parts of butadiene was absorbed in 28 min. of reaction. The butadiene feed was then discontinued and the reaction mixture quenched in water and worked up as in Example 3 to yield a colorless polymer having a viscosity of 7200 poises at 25° C. and an iodine number of 425.

The high reaction rate observed throughout this example, and the fact that the reaction did not cease even when a large amount of butadiene was added is indicative of the freedom from self-termination shown by the process of this invention.

EXAMPLE 6

One part of sodium of about 20 microns average particle size dispersed in 1 part of mineral spirits was added along with 2.7 parts of butadiene-1,3, 4 parts of benzene, 1 part of tetrahydrofuran and 0.2 part of amyl alcohol to an agitated pressure vessel equipped with a gas inlet and a bottom outlet. After mixing for 5 min. at about 25° C., the mixture was passed out of the mixing vessel through a small heat exchanger held at 100° C. and then into an autoclave. During passage through the heat exchanger, the mixture reacted exothermically and essentially all of the butadiene was consumed.

Additional butadiene and benzene were then fed simultaneously into the autoclave in a ratio of 0.8 parts of benzene per part of butadiene while maintaining the reaction temperature at 105° C. until 45 parts of butadiene had been added. One-half of the reaction mixture was then withdrawn, and an additional 45 parts of butadiene was added to the remaining reaction mixture. Withdrawal of one-half of the reaction mixture and addition of 45 parts of butadiene was repeated twice more until a total of 180 parts of butadiene had been added. All of the added butadiene was absorbed by the reaction. The resulting product was a viscous, liquid polybutadiene.

EXAMPLE 7

A continuous process was conducted as follows:

One part of sodium having 10–40 microns average particle size, as a 50% dispersion in benzene, was mixed for 5 min. with 0.8 part of dioxane, 0.1 part of isopropanol and 2.4 parts of butadiene in the pressure vessel described in Example 6. After mixing for 5 min. at about 25° C. the mixture was continuously charged at the rate of 0.42 parts every 15 min. through a heat exchanger held at 100° C. into a polymerization autoclave.

Simultaneous to this feed of initiate, 1.6 parts of butadiene and 2 parts of benzene were continuously fed to the polymerization autoclave and 4 parts of product were continuously withdrawn from the autoclave every 15 min. The reaction temperature was maintained at 105–110° C. during this run. The reaction was continued until all of the initiating charge had been used and 20 parts of butadiene had been polymerized. The product from this run analyzed uniformly between 11–14 poises viscosity at 25° C. and had an iodine number of 430–435.

As will be apparent to those skilled in the art, numerous modifications and variations of the ether modifier, alcohol activator, hydrocarbon solvent, and the proportions of the reactants in the embodiments illustrated above may be made without departing from the spirit of the invention or the scope of the following claims:

We claim:
1. In the method of preparing liquid homopolymers and copolymers of butadiene by reacting a finely divided sodium dispersion with monomer containing a major amount of butadiene-1,3 in the presence of an ether modifier and an alcohol activator, the improvement which comprises thoroughly mixing 1 part by weight of finely divided sodium dispersed in an inert hydrocarbon solvent with 1-3 parts of butadiene-1,3, 0.5-1.5 parts of an ether modifier selected from the group consisting of di(lower alkyl) ethers, dioxane-1,4, and tetrahydrofuran, and 0.05-0.5 part of a lower aliphatic alcohol activator at a temperature below 80° C., raising the temperature of the mixture to 80-110° C. thereby forming a catalytic initiate, and reacting said catalytic initiate with monomer containing 60-100% butadiene-1,3 and 0-40% ethylenically unsaturated comonomer at a temperature of 40-120° C. until a polymer of the desired molecular weight and viscosity is formed.

2. The method of claim 1 wherein 1 part of finely divided sodium dispersed in benzene is thoroughly mixed with 1.5-2 parts of butadiene-1,3, 0.8-1.2 parts of dioxane-1,4 and 0.1-0.4 part of isopropyl alcohol at a temperature below 30° C., the catalytic initiate is formed at 90-105° C., and the catalytic initiate is reacted with monomer containing essentially 100% butadiene-1,3 at 90-110° C.

References Cited
UNITED STATES PATENTS

| | | | |
|---|---|---|---|
| 2,849,510 | 8/1958 | Jaros et al. | 260—669 |
| 3,026,279 | 3/1962 | Mozell et al. | 260—680 X |
| 3,105,856 | 10/1963 | Crouch | 260—680 |

PAUL M. COUGHLAN, Jr., *Primary Examiner.*